United States Patent [19]

Blakely

[11] Patent Number: 4,912,808
[45] Date of Patent: Apr. 3, 1990

[54] OCCUPANT ASSIST STRAP AND INSTALLATION METHOD

[75] Inventor: Jan B. Blakely, Utica, Mich.

[73] Assignee: General Motors Corporation, Detroit, Mich.

[21] Appl. No.: 322,476

[22] Filed: Mar. 13, 1989

[51] Int. Cl.$^4$ .......................... A47B 95/02; B60N 3/02; E05B 1/00

[52] U.S. Cl. ...................................... 16/114 R; 16/119; 16/125; 16/DIG. 19; 16/DIG. 24; 16/DIG. 40; 16/DIG. 42; 296/71

[58] Field of Search .............. 16/111 R, 114 R, 116 R, 16/119, 125, DIG. 15, DIG. 18, DIG. 19, DIG. 24, DIG. 28, DIG. 40, DIG. 42; 296/71

[56] References Cited

U.S. PATENT DOCUMENTS

| | | | |
|---|---|---|---|
| 773,358 | 10/1904 | Weed | 16/114 R |
| 1,454,253 | 5/1923 | Rissman | 16/DIG. 28 |
| 3,619,852 | 11/1971 | Eckberg | 16/114 R |
| 3,923,191 | 12/1975 | Johnson | 16/114 R |
| 4,127,915 | 12/1978 | Logan et al. | 16/114 R |
| 4,356,592 | 11/1982 | Moore | 16/125 |
| 4,404,709 | 9/1983 | Janz et al. | 16/111 |

FOREIGN PATENT DOCUMENTS

| | | | |
|---|---|---|---|
| 2435544 | 2/1976 | Fed. Rep. of Germany | 16/125 |
| 2428540 | 2/1980 | France | 16/DIG. 24 |

Primary Examiner—Nicholas P. Godici
Assistant Examiner—William Scott Andes
Attorney, Agent, or Firm—Charles E. Leahy

[57] ABSTRACT

An assist strap is provided for attachment within spaced apart apertures on a vehicle body. The strap has mounting portions at the end thereof which space the strap from the vehicle body. Attaching legs are provided on each of the mounting portions and are adapted to extend through the apertures, each of the attaching legs having a foot at the end thereof projecting toward the opposite end of the strap so that the space between the feet is less than the spacing between the spaced apart apertures. The strap is constructed to permit flexure of the strap inwardly toward the body so that the feet of the attaching legs spread further apart than the spaced apart apertures of the body to permit insertion of the feet into the apertures whereby subsequent return of the strap to the normal spaced relation from the body causes the feet to engage with the body and thereby attach the assist strap on the body without the need for fasteners. The attaching legs are prevented from subsequent dislodgment from the apertures by installing an escutcheon on the mounting portion with the escutcheon having a blocking leg installable into the aperture in interposition between the attaching leg and the body panel so that a subsequent flexure of the strap is unable to spread the feet of the attaching legs sufficiently apart to permit removal from the aperture.

4 Claims, 1 Drawing Sheet

U.S. Patent        Apr. 3, 1990        4,912,808
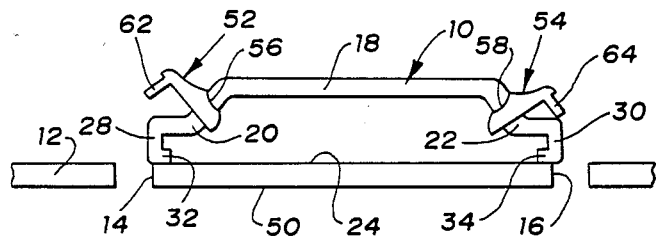
*Fig. 1a*
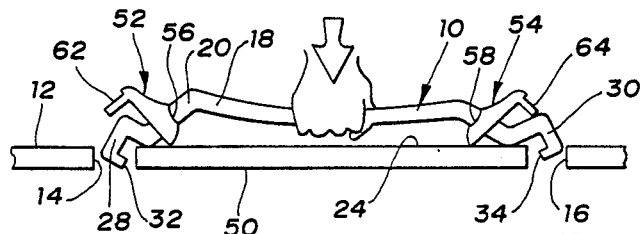
*Fig. 1b*
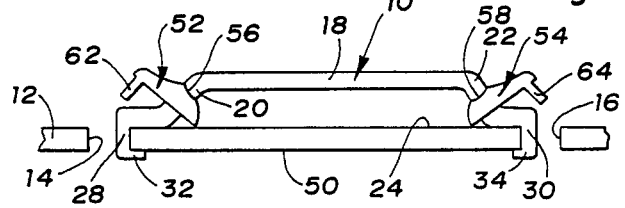
*Fig. 1c*
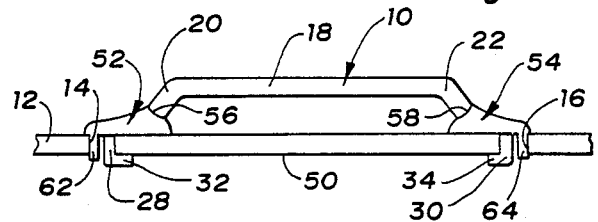
*Fig. 1d*
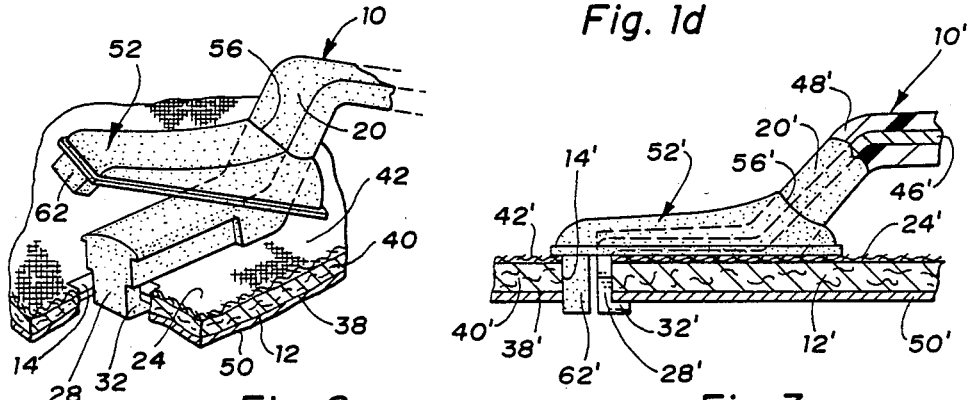
*Fig. 2*        *Fig. 3*

OCCUPANT ASSIST STRAP AND INSTALLATION METHOD

The invention relates to an assist strap mounted in a vehicle body by which the occupant is assisted in closing the door and entering and exiting the vehicle. It more particularly relates to an assist strap installed without fasteners.

BACKGROUND OF THE INVENTION

It is well known in vehicle body interiors to provide an assist strap which is attached to a vehicle door, instrument panel, roof, or other vehicle body structure for convenient gripping by the occupant in order to assist the occupant to enter and exit the vehicle, or to close the door. Such assist straps are commonly comprised of a strap of material having ends attached to a vehicle body panel and a central portion which is spaced away from the vehicle body to permit the occupant to grip the strap. The strap is commonly a metallic strap which may be concealed within a plastic or upholstered covering. Each end of the strap is attached to a mounting bracket which is attached to the body by a screw or some other fastener. An escutcheon may be employed to cover the ends of the strap and conceal the screw from view.

It would be desirable to provide a vehicle body assist strap which could be attached to the vehicle body without the necessity for screws or other attaching devices separate from the assist strap.

BRIEF DESCRIPTION OF THE INVENTION

According to the present invention an assist strap is provided for attachment within spaced apart apertures on a vehicle body. The strap has mounting portions at the end thereof which space the strap from the vehicle body. Attaching legs are provided on each of the mounting portions and are adapted to extend through the apertures, each of the attaching legs having a foot at the end thereof projecting toward the opposite end of the strap so that the space between the feet is less than the spacing between the spaced apart apertures. The strap is constructed to permit flexure of the strap inwardly toward the body so that the feet of the attaching legs spread further apart than the spaced apart apertures of the body to permit insertion of the feet into the apertures whereby subsequent return of the strap to the normal spaced relation from the body causes the feet to engage with the body and thereby attach the assist strap on the body without the need for fasteners. The attaching legs are prevented from subsequent dislodgment from the apertures by installing an escutcheon on the mounting portion with the escutcheon having a blocking leg installable into the aperture in interposition between the attaching leg and the body panel so that a subsequent flexure of the strap is unable to spread the feet of the attaching legs sufficiently apart to permit removal from the aperture.

Accordingly the object, feature and advantage of the invention resides in the provision of a vehicle body assist strap having attaching legs and feet provided thereon which enter apertures in the body panel and engage with the body panel in a manner to prevent subsequent removal from the apertures.

A further object, feature and advantage of the invention resides in the method of installing a assist strap by flexing the assist strap to spread apart integral attaching legs and feet provided thereon for insertion through spaced apart apertures in the vehicle body.

BRIEF DESCRIPTION OF THE DRAWING

These and other feature, objects and advantages of the invention will become apparent upon consideration of the specification and the appended drawings in which:

FIGS. 1a, 1b, 1c, and 1d schematically and sequentially show the method for installing the assist strap;

FIG. 2 is a perspective view of the assist strap in the installed position having parts broken away and in section; and FIG. 3 is a side view of a second embodiment of the invention shown fully installed with an escutcheon concealing the attachment and preventing removal of the assist strap.

DESCRIPTION OF THE PREFERRED EMBODIMENT

According to the drawings it is seen that an assist strap 10 or molded plastic is provided for attachment to a vehicle body panel 12 such as a door, roof or instrument panel. The body panel 12 has apertures 14 and 16 for receiving the assist strap. The assist strap 10 includes a central portion 18 and inwardly offset mounting portions 20 and 22 which abut with the face 24 of the body panel 12 and space the central portion 18 away from the body panel 12 as shown in FIG. 1d.

The assist strap 10 is attached to the aperture body 12 by integral attaching legs 28 and 30 provided on the ends of the mounting portions of the assist strap and spaced apart from one another at a distance equaling the spacing between the apertures 14 and 16. In addition, the attaching legs 28 and 30 each have a inturned foot 32 and 34 which face toward one another and are spaced apart less than the spacing between the spaced apart apertures 14 and 16 of the body panel 12 so that feet 32 and 34 overlap with the body panel 12.

As best seen in FIG. 2, the body panel 12 may be comprised of a sheet metal member 38 covered by a cushioning material 40 and a vinyl covering 42. The assist strap 10 is a one piece construction formed of molded plastic and having the central portion 18, mounting portions 20 and 22, attaching legs 28 and 30, and feet 32 and 34 integrally provided thereon.

FIG. 3 shows an alternate construction of the strap 10' constructed of a spring steel backbone 46' enclosed in a soft vinyl sleeve 48'. The end of the spring steel backbone 46' is bent inwardly shown in FIG. 3 to define the attaching leg 28' and bent laterally as shown in FIG. 3 to define the foot 30' of the attaching leg 28'.

As seen in FIG. 1b, the central portion of the strap 18 is flexible permitting the installer to grip the central portion 18 and forcibly move the central portion in the direction toward the body panel 12. In so doing, the mounting portions 20 and 22 and attaching legs 28 and 30 are splayed outwardly as shown in FIG. 1b with the result that the attaching legs 28 and 30 and their feet 32 and 34 are spread further apart than the spacing between the apertures 14 and 16 of the body panel 12 so that the attaching legs and their feet pass through their apertures 14 and 16. Then, as shown in FIG. 1c, when the flexure force is removed from the center portion 18 of the strap, the assist strap 18 will again return to the free state unflexed position shown in FIG. 1c so that the attaching legs 28 and 30 will have returned to their normal spacing relative one another and the feet 32 and 34 thereof will have engaged with the underside 50 of body panel 12. Accordingly, as seen in FIG. 1c the feet 32 and 34 act to retain the assist strap 10 on the vehicle body 12.

Referring again to FIG. 1b it is seen that the apertures 14 and 16 must be oversized somewhat in order to enable the entry of the attaching legs 28 and 30 and their feet 32 and 34 through the apertures. Accordingly, as seen in FIG. 1c the apertures 14 and 16 remain visible after the attaching legs have been inserted through the apertures. Accordingly, escutcheons 52 and 54 are provided for closing out the apertures and concealing the apertures from view. The escutcheons 52 and 54 may be of die cast metal or plastic construction and preferably have apertures 56 and 58 by which the escutcheons are slipped over the ends of the assist strap 10 prior to the attachment of the assist strap 10 to the body panel. The escutcheons 52 and 54 have respective blocking tabs 62 and 64 which project downwardly therefrom.

As best seen by comparing FIGS. 1c and 1d, the installation of the assist strap 10 is completed by forcing escutcheons 52 and 54 downwardly along the mounting portions 20 and 22 so that the blocking tabs 62 and 64 enter the apertures 14 and 16 in interposition between the attaching legs 28 and 30 and the body panel 12. In this manner, as best shown in FIGS. 1d and FIG. 3 the escutcheons act to conceal the apertures from view and the presence of the blocking tab block the attaching legs 28 and 30 from being again spread apart to the position of the FIG. 1b which would enable the assist strap 10 to be removed from the vehicle body.

Thus it is seen that the invention provides a motor vehicle assist strap and an installation method for such a strap which obviates the necessity for bolts, screws or other fasteners to accomplish the reliable and permanent attachment of the assist strap to the vehicle body.

It will be appreciated that, although the assist strap as shown in the preferred embodiment of the invention is one piece molded plastic assist strap having integral attaching legs and feet, the assist could have alternate constructions. For example, the assist strap may be comprised of a strap of spring steel having the ends thereof bent to define the attaching leg and the feet. The strap of spring steel would then be enclosed in a tubular sleeve of plastic or fabric material to provide a soft feel to the occupant. In addition, it will be appreciated that installation of the assist strap may be performed by first inserted one of the attaching legs through its aperture to engage with body panel, and then flexing the center of the assist strap as shown in FIG. 1b to splay the other other leg outwardly and permit its entry through its associated aperture.

The embodiments of the invention in which an exclusive property or privilege is claimed are defined as follows:

1. A method for installing a vehicle body assist strap device of the type having spaced apart ends adapted for insertion into spaced apart apertures in the body and a central strap extending between the spaced apart ends and being flexible to permit the central strap to be flexed toward and away from the vehicle body, comprising:
   providing attaching legs on the ends of the assist strap, said attaching legs being spaced apart equal to the space of the spaced apart apertures of the body to permit insertion into the apertures and each attaching leg having a foot at the end thereof projecting toward the opposite end of the strap so that the space between the feet is less than the than the spacing between the spaced apart apertures of the body, aligning the attaching legs of the assist strap with the apertures of the body,
   flexing the assist strap toward the body to pivot the attaching legs away from one another so that the spacing between the feet is increased to permit the feet and the attaching legs to insert into the apertures,
   relaxing the assist strap so that the attaching legs are restored to the normal condition with the feet being spaced apart less than the spacing between the spaced apart apertures of the body whereby feet engage with the body to attach the assist strap on the body,
   and installing a blocking device in the apertures to block the attaching legs from being again moved to the increased spacing therebetween so that the assist strap will not be removed from the body upon subsequent flexing the of the assist strap toward the body.

2. A vehicle body assist strap for attachment within spaced apart apertures provided on a vehicle body, comprising:
   a strap having inwardly offset mounting portions at the ends thereof to space the strap from the vehicle body when the mounting portions abut the vehicle body,
   an attaching leg provided on each of the inwardly offset mounting portions and adapted to extend through the aperture, each of the attaching legs having a foot at the end thereof projecting toward the opposite end of the strap so that the space between the feet is less than the spacing between the spaced apart apertures of the body,
   said strap being constructed to permit flexure of the strap inwardly toward the body so that the feet of the attaching legs spread further apart than the spaced apart apertures of the body to permit insertion of the feet into the apertures so that subsequent return of strap to the normal spaced relation from the body causes the feet engage with the body to attach the assist strap on the body,,
   and blocking means installed in the apertures to block the attaching legs from being again moved to the increased spacing therebetween so that the assist strap will not be removed from the body upon subsequent flexing the of the assist strap toward the body.

3. The assist strap of claim 2 further characterized by the blocking means comprising an escutcheon mounted on each of the mounting portions of the assist strap and having a blocking leg installable into the aperture in interposition between the attaching leg and the body panel.

4. The assist strap of claim 2 in which the assist strap is of one-piece molded plastic construction having integrally formed strap, mounting portions, attaching legs and feet.

* * * * *